US012579191B2

(12) United States Patent
Yushkina et al.

(10) Patent No.: US 12,579,191 B2
(45) Date of Patent: Mar. 17, 2026

(54) IDENTIFYING SEARCH RESULTS IN A HISTORY REPOSITORY

(71) Applicant: Google LLC, Mountain View, CA (US)

(72) Inventors: Yana Yushkina, Seattle, WA (US); Mohamad Hasan Ahmadi, Long Island City, NY (US); Sophie Chang, Seattle, WA (US); Michael Blair Crouse, Seattle, WA (US); Justin Gabriel Donnelly, Westlake Village, CA (US); John Oliver Por, San Francisco, CA (US); Mark Chang, Seattle, WA (US); Shuo Meng, Seattle, WA (US); Tommy Chendong Li, Santa Monica, CA (US); Manas Pathak, Palo Alto, CA (US); Denis Brinzarei, Seattle, WA (US); Orin Gabriel Jaworski, Thousand Oaks, CA (US); Jun Zou, Bothell, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/041,779

(22) Filed: Jan. 30, 2025

(65) Prior Publication Data

US 2025/0245270 A1 Jul. 31, 2025

Related U.S. Application Data

(60) Provisional application No. 63/627,543, filed on Jan. 31, 2024.

(51) Int. Cl.
*G06F 16/00* (2019.01)
*G06F 16/9032* (2019.01)
(52) U.S. Cl.
CPC .............................. *G06F 16/90328* (2019.01)

(58) Field of Classification Search
None
See application file for complete search history.

(56) References Cited

U.S. PATENT DOCUMENTS

| | | | | |
|---|---|---|---|---|
| 6,400,826 B1 * | 6/2002 | Chen | ..................... | G06T 1/0028 |
| | | | | 382/100 |
| 8,204,897 B1 * | 6/2012 | Djabarov | ............ | G06F 16/9538 |
| | | | | 707/767 |

(Continued)

FOREIGN PATENT DOCUMENTS

| | | |
|---|---|---|
| CN | 116932733 A | 10/2023 |

OTHER PUBLICATIONS

Zhang, et al., "Spatial-Temporal Interplay in Human Mobility: A Hierarchical Reinforcement Learning Approach with Hypergraph Representation", arXiv:2312.15717v1, Dec. 25, 2023, 9 pages.

(Continued)

*Primary Examiner* — Polina G Peach
(74) *Attorney, Agent, or Firm* — Brake Hughes Bellermann LLP

(57) ABSTRACT

The present disclosure provides a system and methods for providing responses to user provided questions that are grounded in the user's browsing history and enables searching of the history for resources previously viewed based on the content of the resources. In one example embodiment, a portion of a query is received. A query suggestion relevant to the portion of the query is obtained. A resource from a history repository relevant to the portion of the query is identified by obtaining a semantic representation of the portion of the query, and identifying a semantic representation of content associated with the resource from the history repository. The semantic representation of the content includes a similarity score with the semantic representation of the query that satisfies a threshold. A resource suggestion (Continued)

is generated for the resource. The query suggestion and the resource suggestion is provided as selectable query completions.

20 Claims, 5 Drawing Sheets

(56) References Cited

U.S. PATENT DOCUMENTS

| 8,676,828 | B1 * | 3/2014 | Agarwal | G06F 16/3322 |
| | | | | 706/14 |
| 9,594,851 | B1 | 3/2017 | Chechik | |
| 11,238,103 | B2 * | 2/2022 | Lu | G06N 3/049 |
| 11,475,053 | B1 * | 10/2022 | Das | G06F 40/205 |
| 11,755,596 | B2 * | 9/2023 | Balikas | G06F 16/24578 |
| | | | | 707/748 |
| 12,174,864 | B1 * | 12/2024 | Umrao | G06F 16/90324 |
| 2012/0265787 | A1 * | 10/2012 | Hsu | G06F 16/36 |
| | | | | 707/E17.014 |
| 2013/0041878 | A1 * | 2/2013 | Satyanarayana | G06F 16/3322 |
| | | | | 707/706 |
| 2014/0108445 | A1 * | 4/2014 | Oztekin | G06F 16/9535 |
| | | | | 707/767 |
| 2015/0052115 | A1 | 2/2015 | Sharifi | |
| 2016/0210300 | A1 * | 7/2016 | Plakhov | G06F 16/90324 |
| 2017/0046427 | A1 * | 2/2017 | Tang | G06F 16/54 |
| 2017/0242913 | A1 * | 8/2017 | Tijssen | G06F 40/279 |
| 2018/0365257 | A1 * | 12/2018 | Chen | G06N 3/08 |
| 2019/0073415 | A1 | 3/2019 | Franceschini et al. | |
| 2019/0347068 | A1 | 11/2019 | Khaitan et al. | |
| 2020/0311077 | A1 * | 10/2020 | Zhang | G06F 3/068 |
| 2021/0158144 | A1 * | 5/2021 | Coulombe | G06N 3/045 |
| 2021/0191990 | A1 * | 6/2021 | Shi | G06F 40/30 |
| 2021/0216576 | A1 * | 7/2021 | Staub | G06Q 30/0282 |
| 2021/0406335 | A1 * | 12/2021 | Birch | G06F 18/231 |
| 2022/0398291 | A1 | 12/2022 | Menon et al. | |
| 2023/0267126 | A1 * | 8/2023 | Frieder | G06F 16/3349 |
| | | | | 707/748 |
| 2023/0267151 | A1 * | 8/2023 | Chen | G06F 16/3322 |
| | | | | 707/706 |
| 2024/0020308 | A1 * | 1/2024 | Aguerrebere Otegui | |
| | | | | G06F 16/24569 |
| 2024/0111969 | A1 * | 4/2024 | Glass | G06F 40/56 |
| 2024/0144017 | A1 * | 5/2024 | Fournarakis | G06N 3/084 |
| 2024/0289861 | A1 * | 8/2024 | Wang | G06Q 30/0643 |
| 2025/0061351 | A1 * | 2/2025 | Domeniconi | G06N 5/022 |
| 2025/0086391 | A1 * | 3/2025 | Kempf | G06F 16/3347 |
| 2025/0156428 | A1 * | 5/2025 | Lee | G06F 16/243 |

OTHER PUBLICATIONS

International Search Report and Written Opinion for PCT Application No. PCT/US2025/014084, mailed on Apr. 24, 2025, 18 pages.

* cited by examiner

IDENTIFYING SEARCH RESULTS IN A HISTORY REPOSITORY

CROSS-REFERENCE TO RELATED APPLICATION

This application claims priority to U.S. Provisional Patent Application No. 63/627,543, filed on Jan. 31, 2024, entitled "IDENTIFYING SEARCH RESULTS IN A BROWSER HISTORY", the disclosure of which is incorporated by reference herein in its entirety.

BACKGROUND

Browsers provide an interface for viewing resource locators, e.g., a uniform resource location (URL) or a Uniform Resource Identifier (URI), or titles of resources previously viewed. Browsers also include a text box that enables a user to enter a resource locator, to navigate to a particular resource or to initiate searches. The browser may provide suggestions to the user as the user types into the text box. Some of the suggestions may be pages the user has previously visited where the page title or resource locator matches a query term.

SUMMARY

Implementations relate to a system that provides responses to user provided questions that are grounded in the user's browsing history and enables searching of the history for resources previously viewed based on the content of the resources. In some cases, the system provides responses that are grounded in a user's history (e.g., browser, search, etc.) to a user's questions. In particular, with user permission, implementations use a generative model, such as a large language model, to encode the content of pages visited and store the encoded content (e.g., embeddings of the content) on the user's device. The embeddings approximate the content of the pages visited. When a query is received, the system determines which resource has encoded content that is most similar to the query. This resource may be presented to the user as a search result. In some implementations, a generative model may be used to generate a short explanation of how the content of the resource relates to the query.

The details of one or more implementations are set forth in the accompanying drawings and the description below. Other features will be apparent from the description and drawings, and from the claims.

DETAILED DESCRIPTION

Figure 1:
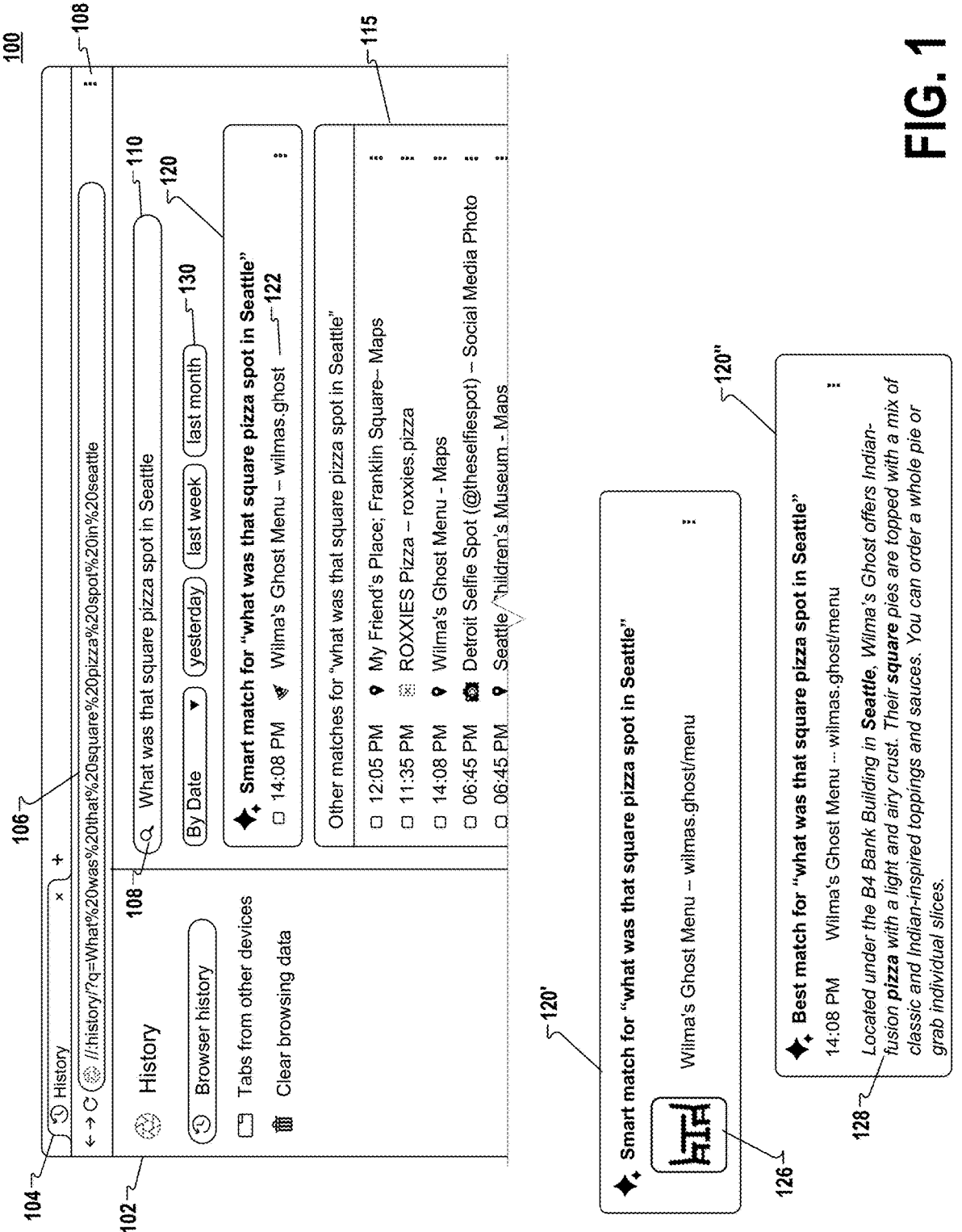
FIG. 1 illustrates an example browsing history search user interface that identifies a history visit based on the content of the visited resource, according to an implementation.

Disclosed implementations provide an ability to identify resources visited by a user in the past based on the content of the resource visited. At least one technical problem with searching browser histories (a previously visited resource, previously viewed content, or a history visit) is the scarcity of information on which a natural language search can be conducted. Browser histories conventionally include the resource locator (e.g., the URL), and sometimes a title for the resource locator. This represents very little text on which to match the resource to a query, which makes it less likely that a history visit will be identified and/or highly ranked in response to an intent query. At least another technical problem with search browser histories is that the memory constraints on a user device make it effectively impossible to store and/or index the content of visited resources on a user device. Thus, when users lose track of a website (resource) they previously visited, the scarcity of searchable text associated with a previously visited resource makes it difficult to surface that website from a browser history.

At least one technical solution provided by disclosed implementations is a memory-efficient semantic representation of previously viewed content that is associated with a resource. The semantic representation is an embedding (or a few embeddings) generated for the resource by a generative model, such as a large language model.

An embedding is a numerical representation that approximates the content of the resource. In some cases, an embedding is represented as a vector of floating-point numbers. The embeddings generated for the previously viewed resource content capture semantic information in the content. The quantity (number) of embeddings generated for a visited resource may be determined by the amount of content represented in the resource. The quantity (number) of embeddings generated for a visited resource may be determined by an amount of memory available for a datastore on the user device. The generative model is used to generate the embeddings because such a model can efficiently capture semantic relationships, thus minimizing the memory resources utilized to provide the ability to recall previously visited resources (previously viewed content associated with a resource) based on the content of the resource rather than just the URL or title. Put another way, the embeddings provide a technical solution for surfacing resources associated with previously viewed content within the memory constraints of a user device. The embeddings respect privacy because the embeddings are encoded representations of content stored only on the user device and are generated with user consent.

The generative model may be tuned for generating embeddings for webpages. For example, the model may be provided with a training set of resources representing web pages. In some implementations, a pre-processing step may break the content of the resource into passages. An embedding may be generated for each passage. Thus, the quantity (number) of embeddings stored can depend on the number of passages identified for the content of a previously visited resource (webpage). In some implementations, the model may be tuned on passage size. In some implementations, the model may be tuned on the number of passages stored (number of embeddings generated) per resource. In some implementations, the generative model takes as input a content provided by a resource (e.g., a webpage and/or information related to the resource).

The embeddings can be stored in a datastore (database, repository) on the user device. In some implementations, one or more embeddings may be generated and stored per visit. In some implementations, one or more embeddings may be generated and stored per resource. In such an implementation, an embedding for a prior visit to the resource may be replaced with a new embedding and a new time (timestamp) of the visit. In some implementations, embeddings may expire after a predetermined period of time and may be deleted from the datastore. In some implementations, the embeddings can be quantized before being stored in the datastore to further reduce memory usage on the user device. Accordingly, the embeddings generated by the generative model capture semantic relationships in a memory-efficient manner and can be used to identify similarity between the content of a previously visited resource and a natural language query. This similarity can be used to return previously visited resources in response to natural language queries, whether the query is issued against a browser search history or in a general search.

For example, browsers can provide a navigation text box that enables a user to navigate to resources, e.g., resources available over a network such as the Internet. Browsers allow users to navigate directly to a resource via a resource locator or by typing text that corresponds with a resource. For example, a user may enter text that starts with a navigation identifier, such as https (the Internet protocol identifier) or www (which identifies the resource as an Internet resource) or the user may type characters that match a domain portion of a resource locator. The browser can provide suggestions for what the user has typed as the user is typing. Many browsers include a combined navigation/ search navigation text box (an omnibox), which enables the user to either initiate a search or navigate to a resource. When browsers provide suggestions, the suggestions can include search (query) suggestions and navigation (resource locator) suggestions. Resource locator suggestions are often influenced (ranked) based on whether a suggested resource appears in a user's browser history, with a boost in rank being applied to suggested resources that are identified in the browser history. But this ranking boost is based on a resource locator match or title match for the suggested resource. Implementations enable the browser to offer a third type of suggestion, a previously visited resource from the browser history, as a suggestion for the query. In some implementations, identification of a browser history resource using the embeddings may be used to re-rank (e.g., boost the rank of) a resource suggested in the omnibox results. For example, if a title of the resource is not a strong relevance match, this relevance can be boosted where the content of the resource (represented by the embeddings) is a match for the query.

For at least the reasons discussed above, disclosed implementations support a user's search for content and assist the user in searching for the content by a continued and/or guided human-machine interaction process. In particular, disclosed implementations enable a browser to search for previously visited resources using query terms that do not appear in either the resource locator (URL) or the title of such a resource.

FIG. 1 illustrates an example browsing history search user interface 100 that identifies a history visit based on content of the visited resource, according to an implementation. The browsing history search user interface 100 of FIG. 1 illustrates a partially rendered browser window of a browser 102. The browser 102 may be an example of browser 320 of FIG. 3. The window of the browser 102 includes a tab 104. The tab 104 of FIG. 1 is configured to display a user interface for interacting with a browser history. The browser 102 includes a navigation text box 106. The navigation text box 106 may be used by a user to navigate to resources. The navigation text box 106 may be used to enter a search query submitted to a default search engine. The navigation text box 106 may be an omnibox.

In the example of FIG. 1, the browsing history user interface is a search history user interface and includes a search box 110. The user can enter a query with one or more terms in the search box 110. The query can be a natural language query. A natural language query is a query entered in a conversational format rather than a format optimized for a computer (e.g., an SQL query or a regex). Because the search box 110 is for a browsing history search, the query may be submitted to the browser 102, e.g., when the user presses an 'enter' key or selects a search control 108, etc. In some implementations, the browsing history search user interface 100 may include filters 130. Filters 130 may be used as constraints on the query. Put another way, filters 130 may be used to exclude otherwise responsive resources and/or to re-rank responsive resources. Accordingly, filters 130 may be any kind of user interface controls that enable selection of a constraint by the user.

In response to the query, the browser 102 may identify history visits that are responsive to the query as search results for the query. A search result includes at least a title or a resource locator of a resource that is responsive to the query. In disclosed implementations, the history visits that are responsive to the query based on the title of the resource or based on a resource locator (e.g., URL) of the resource may be listed in the identifier search results 115. The identifier search results 115 represents conventional search results for previously visited resources in a history repository (e.g., history views). Put another way, the resources appearing in the identifier search results 115 may be listed because the previously visited resource has a portion of the resource locator and/or a portion of the title that matches a term in the search query. As illustrated, this can include history views that are not actually relevant to the query submitted. For example, My Friend's Place may be listed first because two terms in the title match two query terms, and the Seattle Children's Museum listed because it includes one query term even though it is not a pizza spot.

In disclosed implementations, the history visit (or visits) that match the query (i.e., a semantic match) based on the content of the resource may be listed in content search results 120. The content search results 120 may include a top-ranked history visit (a previously visited resource) based on how relevant the content of the resource is to the query. This relevancy of content may be determined on the user device based on the similarity between the embedding(s) of the resource and an embedding generated for the query. The embedding generated for the query may be generated using the same generative model that generated the embedding/ embeddings for the resource. In some cases, the query is provided as input to the generative model. The embedding which is provided as output of the generative model is then compared to embeddings that were generated from webpages visited previously. Implementations can use any appropriate embedding similarity measure, such as cosine similarity, $\ell$-2 distance, etc.

Although illustrated with one responsive result 122, the content search results 120 can include one, two, three, or more, responsive results. The responsive result 122 can be shown with a time of the history view, an icon (e.g., favicon) associated with the resource, a title of the resource, and a resource locator, or portion of a resource locator, for the resource. In some implementations, as illustrated in content search results 120', the search result 122 may include an image 126 taken from the content of the resource. The image 126 may be a thumbnail image. In some implementations, the image 126 may be identified as a most prominent image or a most salient image for the resource.

In some implementations, as illustrated in content search results 120", the search result 122 may include a generated answer 128 for the resource. The generated answer 128 may be generated based on the query and the content of the resource, as described herein. Although illustrated as a separate user interface section than the identifier search results 115, in some implementations, the content search results 120 and the identifier search results 115 may be combined in a single user interface section.

Although illustrated as a user interface for a desktop browser, the browsing history search user interface 100 and content search results 120 can be an interface for a mobile device. In some implementations, the browser search history user interface 100 can be presented in a side panel. In such implementations, selection of the suggestion may result in the display area for the new tab page being reduced and a browser-controlled area being displayed, with the browser search history user interface displayed in the side panel.

In some implementations, the browsing history search user interface 100 can be generated without communication with a server. In some implementations, the browsing history search user interface 100 can be generated with minimal communication with a server (e.g., to generate the generated answer 128). In some implementations, the generated answer 128 can be generated on the user device (so no communication with the server is needed). In implementations that group history visits, the content search results 120 can include the group that a resource is contained in as the search result or as part of the search result. Although illustrated as a search using a browser as an example for ease of explanation, implementations can be used in similar circumstances, such as searching a file repository where a semantic representation (embedding/embeddings) has been generated for the content of the file, or searching for any other previously viewed content captured as a semantic representation in the history repository 323.

Figure 2:
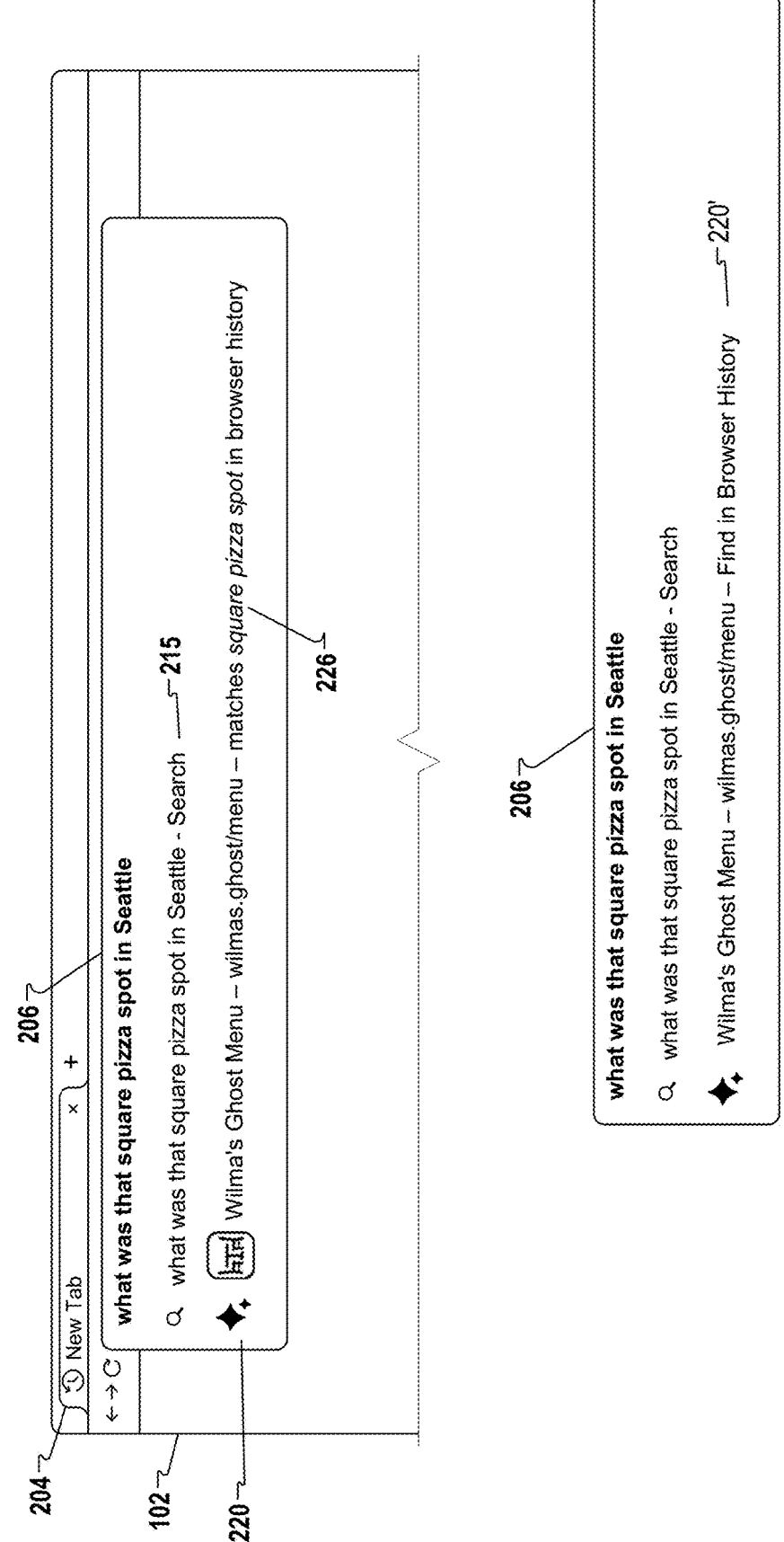
FIG. 2 illustrates an example omnibox user interface that identifies a history visit based on the content of the visited resource, according to an implementation.

FIG. 2 illustrates an example omnibox user interface 200 that identifies a history visit based on the content of the visited resource, according to an implementation. The omnibox user interface 200 of FIG. 2 illustrates a partially rendered browser window of a browser 102. The browser 102 may be an example of browser 320 of FIG. 3. The window of the browser 102 includes a new tab 204. The tab 204 of FIG. 1 is configured to display a new-tab page user interface. The browser 102 includes a navigation text box 206, which has been expanded to include suggestions for a search typed into the navigation text box. The suggestions are considered query completions. The navigation text box 206 has functionality similar to the navigation text box 106 described in FIG. 1.

In the example of FIG. 2, the user has typed a query of what was the square pizza spot in Seattle into the 206. In response to receiving the query (e.g., as the query is entered), the browser 102 may generate a list of suggestions, e.g., query suggestion 215 and resource suggestion 220. The query suggestion 215 is a selectable control. In response to selection of the query suggestion 215, the browser 102 may initiate a search with a search engine. In response to receiving the search results for the query, the browser 102 may display a search result page. The query suggestion 215 may represent a completion of the query that is relevant to a portion of the query. The portion can represent an unfinished query or a completed query. The resource suggestion 220 is also a selectable control. Put another way, the icon, image, and text of the resource suggestion 220 may collectively be the selectable control, such that selection of any portion causes the browser 102 to perform an action.

The action may be opening the resource (navigating to the resource) in the browser tab 204. The action may be opening the browsing history user interface, such as the browsing history search user interface 100 of FIG. 1. The resource corresponding to the resource suggestion 220 may be identified based on a similarity between a semantic representation (embedding) for a portion of the content of the resource and a semantic representation (embedding) for the query/portion of the query.

In some implementations, the resource corresponding to the resource suggestion 220 may be a resource being most similar to the query based on the semantic representations, i.e., having a highest similarity score. In some implementations, the resource corresponding to the resource suggestion 220 may be a resource having a similarity score that satisfies a threshold. In some implementations, more than one resource suggestion can be identified and displayed, e.g., any or a predetermined number of resources that have a similarity score with the query that satisfies the threshold (based on the semantic representation). In some implementations, the resource identified in the resource suggestion 220 may be highlighted or otherwise emphasized (placed in a position of prominence). In some implementations, the resource suggestion 220 can include justification text 226. The justification text may indicate why the resource is presented as a suggestion.

Resource suggestion 220' illustrates an alternative format for resource suggestion 220. The resource suggestion 220' is also a selectable control. In response to selection of the resource suggestion 220', the browser 102 is configured to open a browsing history search user interface, such as browsing history search user interface 100 of FIG. 1. As with resource suggestion 220, the browser 102 may open the browsing history search user interface in a side panel, in a new tab, or may navigate to the browsing history search user interface in the tab 204. Although not illustrated in FIG. 2, in some implementations the user can use a special character to search for history views from the omnibox. For example, in response to typing "@histcontent", the omnibox may provide a text input box for entering a query and only results generated from the embeddings may be provided as results.

Although not illustrated in FIG. 2, the query suggestion 215 (or another similar query suggestion) and the query suggestion 220 may be provided to a partial query entered into the navigation text box 206. In other words, one or more query suggestions matching a portion of the query (i.e., a semantic match) can be provided in addition to one or more resource suggestions that have sufficient similarity to the portion of the query, i.e., a partial query. Because the query suggestion 215 and the resource suggestion 220 are selectable, they may also be referred to as selectable query completions.

Figure 3:
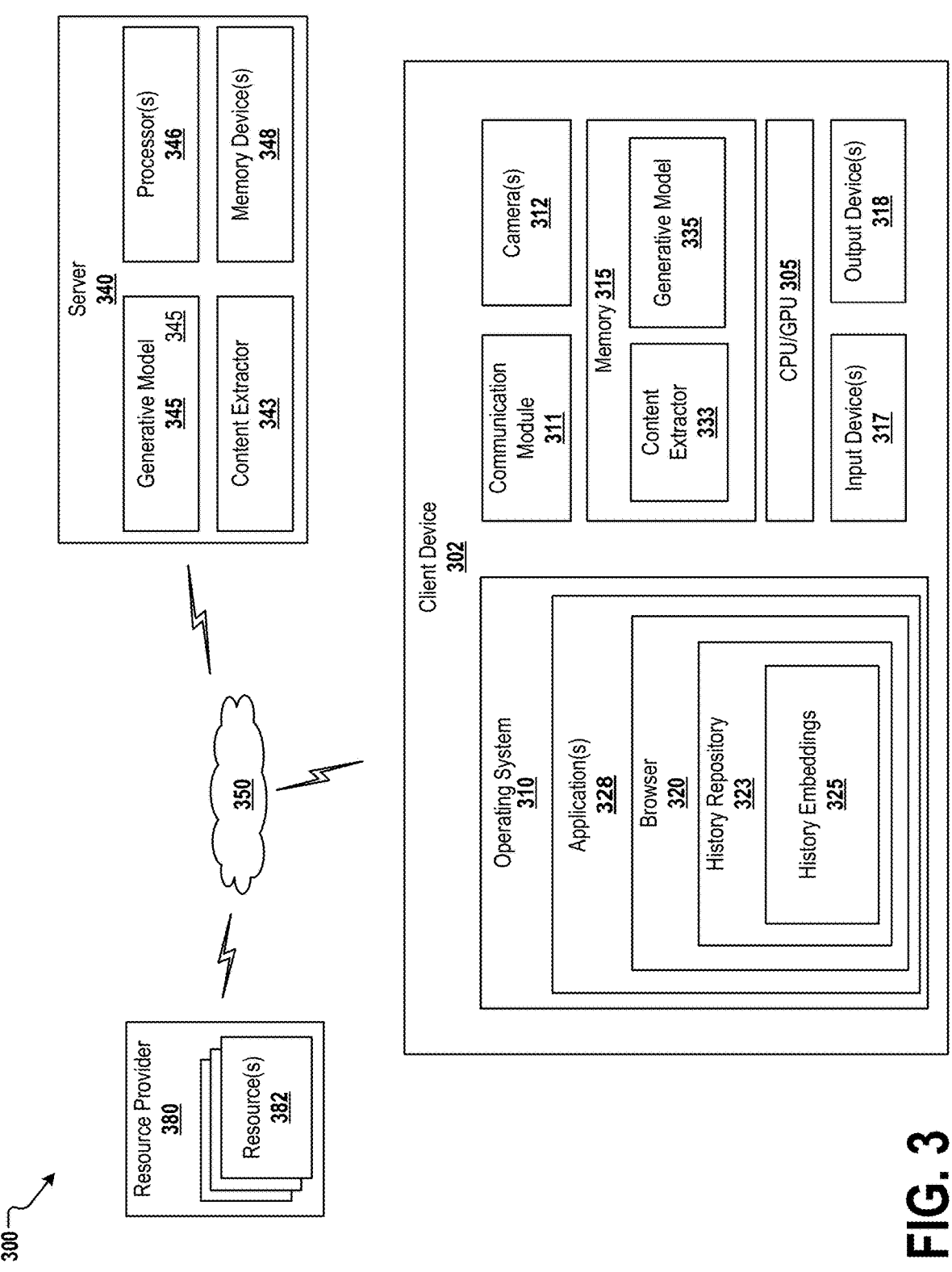
FIG. 3 illustrates a block diagram of an environment for content-based retrieval of history visits, according to an implementation.

FIG. 3 illustrates a block diagram of an environment 300 for content-based retrieval of history visits, according to an implementation. FIG. 3 illustrates an example environment 300 for generating history embeddings 325 and using those history embeddings 325, e.g., to provide the content-based retrieval of history visits, to improve other history-based features that rely on clustering history visits based on similar content, etc.

The environment 300 includes a client device 302. The client device 302 is a user device on which a browser 320 executes. The client device 302 can be a mobile computing device such as a mobile phone, tablet, or personal digital assistant. The client device 302 can be a personal computing device, such as a laptop or desktop computer or a smart TV. The client device 302 can also be referred to as a user device. In some implementations, the client device 302 may be a wearable device, such as AR/VR glasses or goggles. The client device 302 includes a network interface (e.g., communication module 311) configured to connect the client device 302 to the network 350 (e.g., the Internet). The network interface may include a mobile network interface and/or WI-FI network interface. The client device 302 may include any number of input devices 317 and/or output devices 318. Input devices 317 may enable a user to interact with the client device 302, e.g., to provide input to a navigation text box of a browser 320, to enter search queries in a search box, and/or to select a suggested resource or suggested query. Example number of input devices 317 include a keyboard, a mouse, a stylus, a touchscreen, a microphone, a camera 312, etc. Thus, for example, queries can be entered via voice recognition. The output devices 318 enable the client device 302 to provide information to the user and can include a display (including a touchscreen), a speaker, LED indicators, etc.

One or more of the components of the client device 302 can be, or can include, an electronic processor(s) 305 configured to process instructions stored in a memory, such as memory devices 315. The memory devices 315 may store application data. The memory devices 315 may store applications, such as the operating system 310, applications 328, etc. In some implementations, the memory device 315 may store models that perform functions for the applications 328. For example, the models can include a generative model 335. The generative model 335 can be a user-device version of the generative model 345. The memory devices 315 may also store content extractor 333. The content extractor 333 may be a user-device version of the content extractor 343. In implementations that store content extractor 333 and/or generative model 335 in memory devices 315, communications with the server 340 may be reduced, saving bandwidth and battery resources. For example, in such implementations the browser 320 may not need to communicate with the server 340 to identify history views responsive to a query or suggested as query completions. In some implementations, the history repository 323 and/or the history embeddings 325 may be stored in the memory devices 315.

A browser history, such as history repository 323, stores, with user permission, resource locators (URLs) visited by the user profile. A date that the user visited the resource may also be recorded in the history repository 323. The title of the visited resource may be stored with the date (timestamp) of the resource in the history repository 323. The information stored for a resource in the history repository 323 is referred to as a history visit. Thus, a history visit describes a resource visited. The history visit may also describe a time (date, date and time) of the visit. The browser 320 may include a user interface for clearing (deleting) the history repository 323. In some implementations, when history repository 323 is cleared, any history embeddings 325 are also cleared (deleted).

In disclosed implementations, the history repository 323 can include history embeddings 325. The browser 320 may store history embeddings 325 for each history visit. The browser 320 may store history embeddings 325 for each visited resource, e.g., by overwriting an earlier embedding associated with the same resource. The browser 320 may filter out certain resources from the history embeddings 325. For example, the browser 320 may not store history embeddings 325 for resources from certain domains that include certain categories of content (e.g., no content from email applications/domains, no content from resources that change rapidly, such as social media feeds, news feeds, etc.) Thus, not every history visit may have a corresponding history embedding 325. Moreover, the user may be provided with controls allowing the user to make an election as to both if and when the environment 300 and/or the browser 320 may enable the generation of the history embeddings 325. For example, the browser 320 may include a settings user interface where a user may control operations of the browser 320. Generating history embeddings 325 and thus providing history views based on content in response to a query, is an example of browser operations the user can control. Thus, implementations provide the user with control over what information is collected, how that information is used, and what information is provided to the user.

The client device 302 may include an operating system 310 and one or more applications 328. An application is a set of instructions stored in a memory that are executable by the electronic processor(s) 305 to perform operations. Memory devices 315 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. memory devices 315 may be shared between multiple processors, or multiple computing devices and may include a non-transitory computer-readable medium storing instructions executable by one or more of the processors. Memory devices 315 may include, e.g., volatile memory unit or units, a non-volatile memory unit or units, and/or other forms of non-transitory computer-readable media, such as a magnetic or optical disks, flash memory, cache, Random Access Memory (RAM), Read Only Memory (ROM), and combinations thereof.

The applications 328 can include the browser 320. The browser 320 is an application designed to communicate with other computing devices, such as resource provider 380 and server 340, to fetch and render content of resources 382, etc. The browser 320 may acquire the content of a resource 382 by loading a native library of the browser 320, performing a domain name system (DNS) lookup based on the resource locator (URL) associated with a particular resource 382, and downloading the resource content from a resource provider 380. The browser 320 includes a renderer for presenting the resource content to the user, e.g., in a browser tab of a browser window. A browser window can be associated with a profile of a user.

The browser 320 may have tools to support navigation, such as bookmarks, browsing history, etc. Also, the browser 320 may define forward and back buttons to navigate through previously viewed resources (web pages). Through the use of the browser 320, resources (such as web pages) may provide a navigation bar, sitemap, dropdown menu, etc. to navigate to different resources within a domain (e.g., resource provider 380). In some implementations, the browser 320 is a mobile browser designed for use on an operating system of a mobile device. The mobile browser is configured to render and display mobile tabs and/or web pages in a mobile format (or in a desktop format). In some implementations, the browser 320 may be integrated into the operating system 310 (e.g., a browser-based operating system).

The browser 320 may be programmed to provide a text input field for navigating to resources, e.g., by enabling the user to enter a resource locator, such as www.domain.com.

The text input field is referred to as a navigation text box. This navigation text box is often called an address bar and, when configured to either navigate or search, can also be referred to as an omnibox. The browser 320 may include a user interface element, such as three-dot-menu 108, that enables a user to select various browser-provided user interfaces. Two of the browser-provided user interfaces include a settings user interface and a history user interface. The history user interface may include a search interface, e.g., browsing history search user interface 100 of FIG. 1.

To support the ability to provide previously viewed resources in response to a query based on the content of the resource (and not just the URL/title of the resource), the browser 320 may cause history embeddings 325 to be generated. This may occur continuously, i.e., in response to a user loading a resource in a tab of the browser 320. To generate the history embeddings 325, the browser 320 may cause the content of the resource (the webpage) to be extracted (e.g., by content extractor 333 or content extractor 343) and encoded by a generative model (e.g., generative model 335 or 345).

In some implementations, the browser 320 requests an embedding (or embeddings) for a resource from the server 340. In some implementations, the browser 320 sends the inner HTML of the webpage to the content extractor 343. The inner HTML can include content from a webpage's headers and footers. Server 340 may be a computing device or computing devices that take the form of a number of different devices, for example a standard server, a group of such servers, a distributed computing system such as a rack server system. One or more of the components of the server 340 can be or can include processors 346 configured to process instructions stored in a memory, such as memory devices 348. The server 340 may be associated with a developer of a browser, such as browser 320.

The server 340 may include the content extractor 343 and a generative model 345. The content extractor 343 is a program or service configured to extract the text from a web page. In some implementations, the content extractor 343 extracts a single passage for the content of the resource. In some implementations, the content extractor 343 is configured to separate the content into two or more passages. In such an implementation, the history embeddings 325 may include more than one embedding per history visit, i.e., the history embeddings 325 may include one embedding for each passage of the resource. This increases the storage requirements of the history embeddings 325 but can improve the relevance of the search results. Thus, the number of embeddings stored per resource visit is a tuning parameter that balances memory resources (size/speed) with search result performance (recall/precision). In some implementations up to five embeddings may be stored for a resource.

The content extractor 343 may provide the passage (or passages) to the generative model 345. The generative model 345 is a generative model, such as a large language model, that can use a decoder-only transformer architecture, and that performs language understanding and generation tasks. The generative model 345 takes a passage as input and generates an embedding as output. The embedding is a vector representation of the passage, e.g., using a large set of numbers to capture the semantic information in the passage. The generative model 345 can be tuned for processing webpages. Put another way, in some implementations, the generative model 345 may be optimized to generate embeddings for webpage content. This can be done by using training sets of webpage content. If multiple passages are generated from the content of the resource by the content extractor 343, multiple embeddings are generated by the generative model 345 for the resource. The server 340 provides the embedding (or embeddings) generated by the generative model 345 to the browser 320. The server 340 does not store the content or any association between the content and the client device 302 or the user of the client device 302.

In some implementations, the client device 302 may include a copy of the content extractor 343 and/or the generative model 345. The copies may be user-device friendly (smaller memory footprint) versions of the content extractor 343 and/or the generative model 345 running on the server 340. In such implementations, the browser 320 may use the content extractor 333 and/or the generative model 335 to generate the embeddings.

The browser 320 may store the generated embeddings in the history embeddings 325. The history embeddings 325 may store a history embedding by URL. Put another way, a unique resource locator may have a respective embedding stored in the history embeddings 325. In some implementations, history embeddings may be deleted from the history embeddings 325 based on a combination of age, recency, and frequency. In some implementations, the browser 320 may store an embedding per visit of a webpage. In such implementations, the number of embeddings stored per webpage (URL) may be limited to a predetermined number. In some implementations the history embeddings 325 may be an in-memory database. In some implementations, the history embeddings 325 may support versioning. In particular, the embedding representations may change over time (e.g., via tuning of the generative model 345), so a particular embedding may be associated with a version number.

The browser 320 may be configured to use the history embeddings 325 to respond to queries. The queries can come from a browsing history search interface, such as browsing history search user interface 100. The queries can be partial (incomplete) or full input entered into an omnibox. When a query is received, the browser 320 may obtain an embedding of the query. For example, the browser 320 may request an embedding from the server 340 or use content extractor 333 and generative model 335 to generate the embedding.

In some implementations, the content extractor 343 may be configured to extract constraints from the query. A constraint can be an attribute used to filter out otherwise responsive resources. An example of a constraint is a date. For example, the query may specify "last week" or "last month" etc. (i.e., a last visited timestamp), and this date constraint may be extracted from the query before it is encoded. The constraints (including date constraints) can be identified using regular expressions. A regular expression is a sequence of characters that can include operators and constructs forming a pattern that can be used to match strings.

In some implementations, the generative model 345 may be configured to extract constraints and put the constraints into a format usable by the browser 320. The constraint(s) extracted may be provided with the query embedding to the browser. The browser 320 may use the constraints in filtering out embeddings from the history embeddings 325 that fail to meet the constraint. Such filtered-out embeddings may not be considered for similarity with the query. The browser 320 may use the constraints in ranking of resources that have embeddings similar to the query, as described below.

The browser 320 may be configured to compare the query embedding to the history embeddings 325 to identify responsive resources. Put another way, resources that correspond to embeddings most similar to the query are identified. These embeddings are referred to as nearest neighbors. Any similarity measure can be used for determining the nearest neighbors. In the context of nearest neighbor algorithms, a similarity measure is a distance where a smaller distance between two data points indicates greater similarity. This distance may be calculated using metrics such as Euclidean distance, Cosine similarity, Manhattan distance and the like depending on the data type and problem domain. In some implementations, the browser 320 may rank the nearest neighbors (the resources with embeddings most similar to the query embedding). Ranking can be based on strength of similarity. Strength of similarity can be represented as a similarity score assigned by the similarity measure. Ranking can include applying constraints, such as a date range, where historical visits that meet the constraint may receive a ranking boost. In some implementations, ranking can ensure that resources from the same domain do not dominate the search results. For example, the browser 320 may select a top-ranking resource from a domain if there are more than two resources from a domain in the nearest neighbors. The browser 320 may select a highest-ranking resource from the nearest neighbors to provide as the search result, e.g., search result 122 or resource suggestion 220. The browser 320 may select two, three, etc. of the highest-ranking resources for presentation in the content search results 120 or resource suggestion 220. The search result may identify a title of the resource. The search result may identify a locator (URL) of the resource. The search result may identify an icon for the resource. The search result may identify a date, time, etc. (timestamp) for the history visit. The search result may include an image. The image may be an image cached with the embedding, selected by the generative model 345, or identified by a service that identifies a most salient image included in the content of a resource. See the description of FIG. 4 below, which depicts an example architecture that may be employed by the browser 320 to provide responses to a query using on the history embeddings 325.

In some implementations, the browser 320 may generate a brief text answer (e.g., no more than three to five sentences) for the query, e.g., generated answer 128. In some implementations, the browser 320 may generate the text answer using one or more of the top-ranking resources. For example, the browser 320 may re-fetch the content of the resource, e.g., from the host server of the resource. As another example, the browser 320 may request the content from an index, such as a search engine that stores content of a most recently indexed version of the resource. As another example, the browser 320 may obtain a cached version of the content of the resource, e.g., from a local cache or an online cache. The browser 320 may then send that content to the generative model 345 (or generative model 335) with a prompt that asks the generative model 345 to generate a brief answer to <query> from the content provided in the request, where <query> is the query provided by the user. In some implementations, the content of more than one resource may be provided (e.g., top two, top three ranked resources) with the prompt. The browser 320 may include the text answer in the search result.

The network 350 may include the Internet and/or other types of data networks, such as a local area network (LAN), a wide area network (WAN), a cellular network, satellite network, a WI-FI network, or other types of data networks or a combination of these. The network 350 may also include any number of computing devices (e.g., computers, servers, routers, network switches, etc.) that are configured to receive and/or transmit data within network 350. Network 350 may further include any number of hardwired and/or wireless connections.

Further to the descriptions above, a user may be provided with controls allowing the user to make an election as to both if and when systems, programs, or features described herein may enable collection of user information (e.g., information about a user's browsing history, activities, a user's preferences, a user's current location, etc., generation of history embeddings), and if and when the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 4:
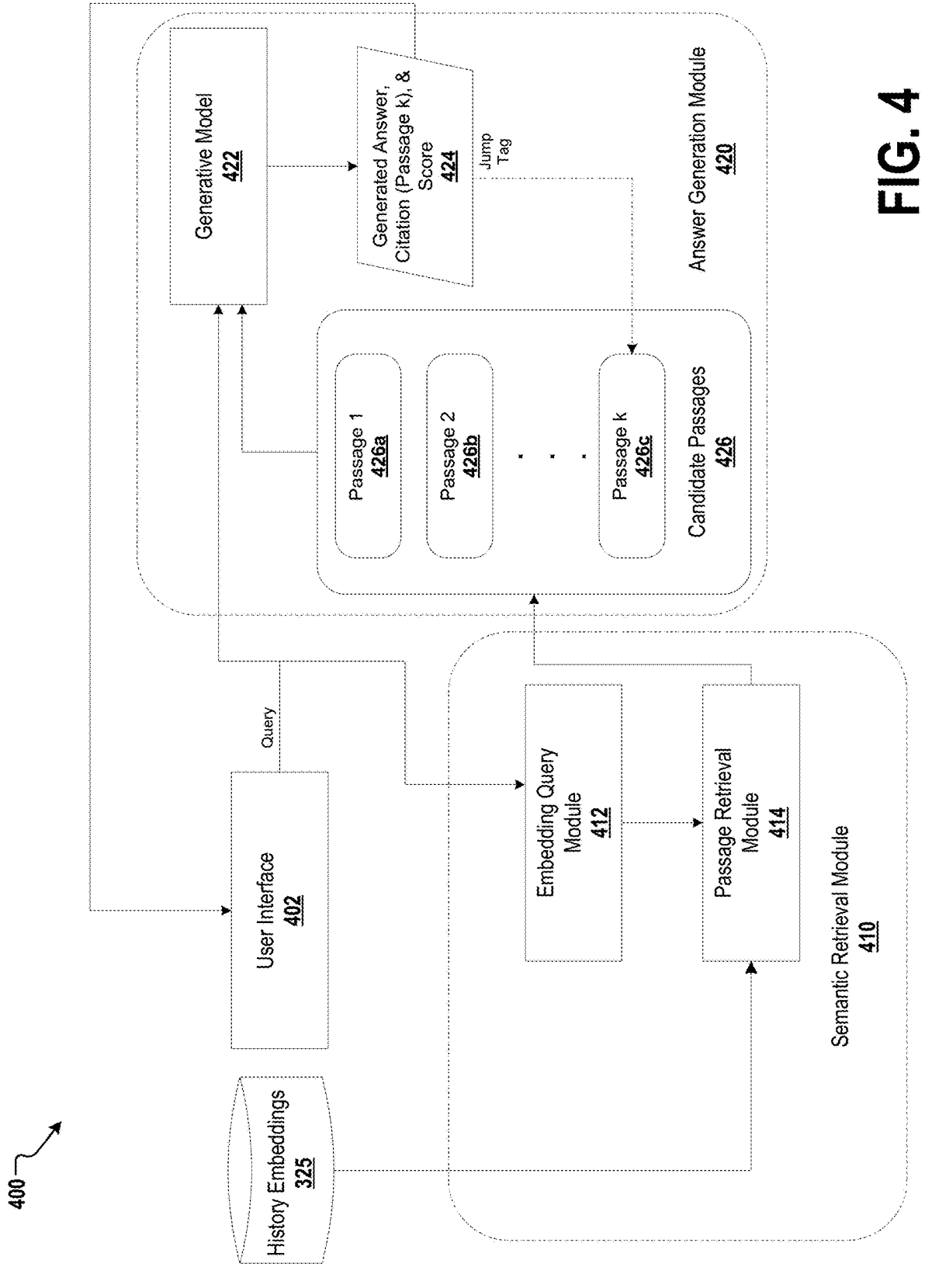
FIG. 4 illustrates a block diagram of an architecture for content-based retrieval of history visits, according to an implementation.

FIG. 4 illustrates a block diagram of an example architecture 400 that can be employed for content-based retrieval of history visits, according to disclosed implementations. In some cases, the example architecture 400 is implemented via a client device and a server device(s) (e.g., the client device 302 and the server 340 described above with reference to FIG. 3). In some cases, the example architecture 400 is implemented via a client device (e.g., client device 302) without interacting with a server, i.e., the client device is configured to execute the generative model locally. As depicted, the snippet example architecture 400 includes user interface 402, semantic retrieval module 410, and answer generation module 420. As depicted, the semantic retrieval module 410 includes embedding query module 412 and passage retrieval module 414. As depicted, the answer generation module 420 includes the generative model 422. In some implementations, the modules 410, 412, 414, and 420 as well as the generative model 422 are executed via an electronic processor (e.g., processing units) configured to process instructions (e.g., modules, engines, models) stored in a memory, such as described above with reference to FIG. 3. In some implementations, the generative model 422 and the generative model 345, when implemented via a server, or the generative model 335, when implemented via a client device, are the same generative model.

The embedding generated for the query may be generated using the same generative model that generated the embedding/embeddings for the resource.

The example architecture 400 leverages the generative model 422 to improve searching of the history visits as well as improving response provided to user queries based on the content of the history embeddings 325. In some cases, the generative model 422 provides historical URL pages, from a user's browser history, that semantically match the user query provided via the user interface 402 (e.g., an interface provided via the browser 320 described above with reference to FIG. 3). The user interface 402 allows a user to interact with the content extractor module 410 and the answer generation module 420. In some cases, the user interface 402 is a graphical user interface (GUI) that allows users to interact with the content extractor module 410 and the answer generation module 420 through graphical icons and visual indicators such as secondary notation.

In some cases, the generative model 422 provides a summarized answer grounded in the user's browsing history, i.e., the history embeddings 325. To put another way, the generative model 422 leverages past website visits and interactions from the user's browsing history to personalize predictions or recommendations. For example, the generative model 422 uses the browsing data as a context to inform the output provided. In some cases, the generative model 422 may employ techniques such as retrieval-augmented generation (RAG) where relevant information from the browsing history is retrieved and factored into the decision-making process. For example, the generative model 422 may be trained for semantic retrieval of matching URL pages, where both page content and user queries are transformed into embeddings, via the embedding query module 412, and their cosine similarities used for ranking. In some implementations, the embedding query module 412 employs the generative model 422 when transforming the user queries into the embedding, which are compared to the embeddings stored to the history embeddings 325. In some implementations, the embedding query module 412 employs a separate model (not shown in FIG. 4). In some implementations, the generative model 422 is executed on device, such as generative model 335 described above with reference to FIG. 3, or via a server, such as the generative model 345 provided via the server 340, and accessed via an interface (e.g., an application programming interface (API)).

In general, the generative model 422 processes the user query and a number of candidate URL passages 426 to generate responses, e.g., Passage 1 426a, Passage 2, 466b, . . . Passage k 426c, where k is the number of candidate URL passages. In some implementations, the generative model 422 receives, via the passage retrieval module 414, the user query and a set of passages 426 from a candidate URL as input. In such implementations, multiple model executions are used to process all candidate URLs, i.e., a set of passages 426 that are grouped according to their respective URL. For each mode execution, the generative model 422 is configured to provide, for example, output 424 that includes an answer to the user query, relevant citations, and a confidence score. In some implementations, a separate model (not shown) is used to generate the citations that are associated with answers based on the input data. In some cases, the answers and their corresponding source URLs are ranked by the confidence scores, which are computed using logits (initial scores given to possible outcomes) of a first decoded token. The generative model 422 is configured to determine a confidence score based on a raw probability score that shows a probability that, for example, the context has information to answer the query. Such implementations improve latency by using speculative decoding and key value (KV) cache. In some implementations, answer generation module 420 is configured to speculative decode by first scoring, via the generative model 422, each candidate URL separately within a respective session and continuing to generate an answer using the session with the highest scored URL. The answer generation module 420 provides the output 424 to the user interface 402, e.g., via the user interfaces described above with reference to FIGS. 1 and 2, in response to the query based on the respective confidence scores. For example, the answer generation module 420 may provide the output 424 having the highest confidence score or the output 424 having a confidence score meeting a threshold.

In some implementations, the generative model 422 combines passages 426 from multiple candidate URLs. In such implementations, when generating answers for a given query for multiple URLs, the model is executed multiple times, e.g., one request per URL. In such implementations, the generative model 422 is configured to provide a summarized answer to the user query by processing the user query and candidate passages 426 from multiple URL pages in a single execution.

In some implementations, the generative model 422 is trained using datasets that include both answers and citations during fine-tuning. In some implementations, the generative model 422 is fine-turned via Low-Rank Adaptation (LoRA), which is a lightweight training technique that reduces the number of trainable parameters. LoRA models are used to fine tune a base model and may be swapped to perform a particular task while still using the same base model. In some implementations, the LoRA training of the generative model includes inserting a smaller number of new weights into the generative model and only training these new weights. To state another way, LoRA is an improved fine-tuning training technique where, instead of finetuning all the weights that constitute the weight matrix of the generative model, a smaller number of matrices, e.g., two, that approximate this larger matrix are fine-tuned. These matrices constitute a LoRA adapter, which is loaded to the generative model and used for inference. Accordingly, training the generative model with LoRA is faster, more memory-efficient, and produces smaller model weights, e.g., tens to hundreds of megabytes.

Figure 5:
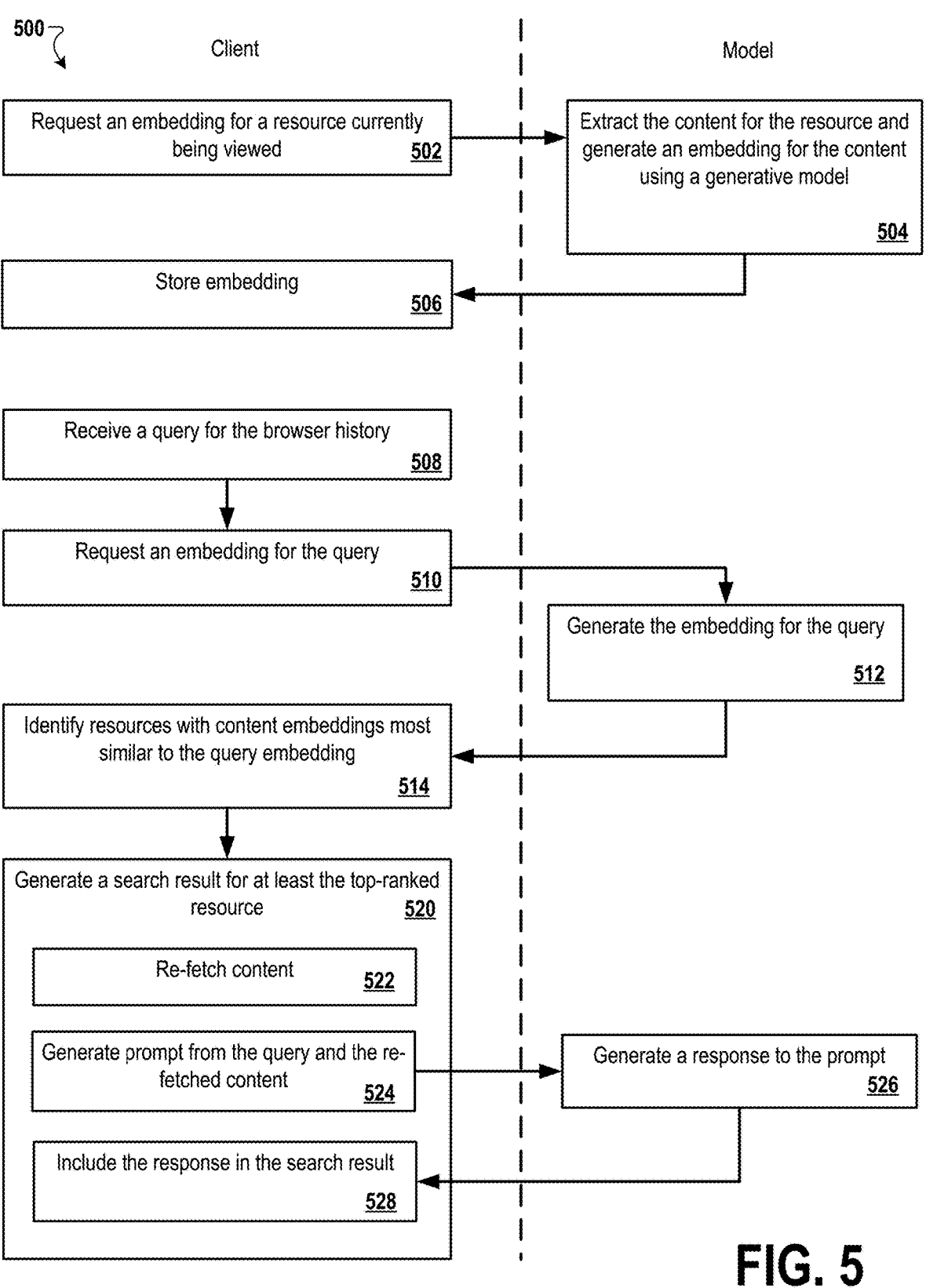
FIG. 5 illustrates a flowchart of an example method of identifying search results in a history, according to an aspect.

FIG. 5 is a flowchart illustrating an example process 500 of identifying search results in a history repository, according to some implementations. The example process 500 can be implemented by systems and components described with reference to FIGS. 1-4. For example, the process 500 may represent operations of a server (e.g., server 340) and/or a client (user) device (e.g., browser 320). The process 500 may represent operations of a client device executing a browser (e.g., some or all of the operations illustrated in FIG. 5 as performed by the server may, in some implementations, be performed at the client device). Although the process 500 of FIG. 5 illustrates the operations in sequential order. However, it will be understood that the process 500 may be performed, for example, by any other suitable system, environment, software, and hardware, or a combination of systems, environments, software, and hardware as appropriate. In some implementations, various operations of the process 500 can be run in parallel, in combination, in loops, or in any order.

At 502, an embedding is requested for a resource currently being viewed via browser 320. From 502, the process proceeds to 504 where the content for the resource is extracted via a (e.g., the content extractor 333 when executed locally and/or content extractor 343 when executed via the server). An embedding for the content is generated via a generative model (e.g., the generative model 335 when executed locally and/or generative model 345 when executed via the server). In some cases, a plurality of passages are extracted via the content extractor from the provided content. In such cases, the generative model provides an embedding for each passage. From 504, the process proceeds to 506 where the embedding(s) is stored history embeddings 325.

From 506, the process proceeds to 508 where a query is received for the browser history via the user interface 402. From 508, the process proceeds to 510 where a request for an embedding for the query is provided to the semantic retrieval module 410 (via the embedding query module 412). From 510, the process proceeds to 512 where the embedding for the query is generated by a generative model (e.g., the generative model 335 or generative model 422 and/or the generative model 345 when providing calls to a server). As described above, in some implementations, a generative model is employed both to generate the embeddings for the content (and passages) and the query as well as to generate answers to the query. In some implementations, a generative model is used to generate the embeddings for the content and query and a separate generative model is used to provide the answers to the queries. In some implementations, a first generative model is configured to provide the embeddings for the content and passages, a second generative model is configured to provide the embeddings for user queries, and a third generative model is configured to provide answers to the queries based on the matched embeddings.

From 512, the process proceeds to 514 where resources with content embeddings most similar to the query embedding are identified via the semantic retrieval module 410 (passage retrieval module 414).

From 514, the process proceeds to 520 where a search result is generated via the answer generation module 420 for at least the top-ranked resource using a generative model (e.g., generative model 422). As part of step 520, the process proceeds to 522 where content for an identified response may be re-fetch for the resource, pulled from cache, or via other means. From 522, the process proceeds to 524 where a prompt is generated from the query and the re-fetched content. From 524, the process proceeds to 526 where the generative model 422 generates a response to the prompt. From 562, the process proceeds to 528 where the response is included in the search result via the user interface. 402. From 520, the process 500 ends or repeats.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

The following paragraphs provide various examples of the embodiments disclosed herein.

Clause 1. A method comprising: receiving a portion of a query; obtaining at least one query suggestion relevant to the portion of the query; identifying a resource from a history repository relevant to the portion of the query by: obtaining a semantic representation of the portion of the query, and identifying a semantic representation of content associated with the resource from the history repository, the semantic representation of the content having a similarity score with the semantic representation of the query that satisfies a threshold; generating a resource suggestion for the resource; and providing the at least one query suggestion and the resource suggestion as selectable query completions for the portion of the query.

Clause 2. The method of clause 1, wherein the history repository is associated stored on a user device of a user issuing the query.

Clause 3. The method of clause 2, wherein the semantic representation of the content associated with the resource is generated and stored in the history repository in response to a previous viewing of the content associated with the resource on the user device.

Clause 4. The method of clause 1, wherein the semantic representation of the content relates to a first portion of content associated with the resource and the history repository includes a semantic representation of a second portion of content associated with the resource.

Clause 5. The method of clause 1, wherein the at least one query suggestion, in response to selection, is configured to initiate a search using the at least one query suggestion and the resource suggestion, in response to selection, is configured to initiate a display of the content of the resource.

Clause 6. The method of clause 1, wherein obtaining the semantic representation of the query includes providing the query as input to a generative model, the generative model providing the semantic representation as an output for the input.

Clause 7. A system comprising: an electronic processor configured to perform the method of any one of clauses 1-6.

Clause 8. A non-transitory computer-readable medium including instructions that, when executed by an electronic processor, cause a computing system to perform the method of any one of clauses 1-6.

Clause 9. A method comprising: receiving, from a user interface, a query for a history repository; generating a prompt based on the query and a resource identified from the history repository, the resource identified based on a semantic representation of the query, a semantic representation of content provided by the resource, and a threshold; obtaining a response to the query by processing the prompt through a generative model; and providing the response to the user interface.

Clause 10. The method of clause 9, wherein the resource is identified by: generating the semantic representation of the query; determining a similarity score between the semantic representation of the query and the semantic representation of the content; ranking the resource in a ranking of other resources in the history repository based on the similarity score; and identifying the resource as a semantic match for the resource based on the similarity score and the threshold.

Clause 11. The method of clause 10, wherein the semantic representation of the query is a first semantic representation and the semantic representation of the content is a second semantic representation, and the similarity score is based on a cosine similarity between the first semantic representation and the second semantic representation or an $\ell$-2 distance between the first semantic representation and the second semantic representation.

Clause 12. The method of clause 10, wherein the ranking is based on the similarity score and at least one constraint provided by a user of the user interface.

Clause 13. The method of clause 9, wherein the prompt includes passages from the content, the response is provided to the user interface based on a confidence score associated with the response, and the confidence score is determined by the generative model.

Clause 14. The method of clause 9, wherein the resource is a first resource; and the prompt is generated based on the query, the first resource, and a second resource identified based on the semantic representation of the query, a semantic representation of content provided by the second resource, and the threshold.

Clause 15. The method of clause 14, wherein the response includes a summarized answer to the query based on the content provided by the first resource and content provided by the second resource.

Clause 16. The method of clause 9, wherein the semantic representation of the content provided by the resource is a numerical representation, generated by the generative model, that approximates the content.

Clause 17. The method of clause 9, wherein the query includes terms that do not appear in a resource locator for the resource or a title associated with the resource.

Clause 18. The method of clause 9, wherein the response includes a search result that includes information related to the resource.

Clause 19. The method of clause 18, wherein the information related to the resource includes a resource locator and at least one of an icon, a last visited timestamp or an image.

Clause 20. The method of clause 9, wherein the prompt is generated based on content provided by the resource, the method further comprising: re-fetching the content, requesting indexed content for the content, or obtaining a cached version of the content.

Clause 21. A system comprising: an electronic processor configured to perform the method of any one of clauses 9-20.

Clause 22. A non-transitory computer-readable medium including instructions that, when executed by an electronic processor, cause a computing system to perform the method of any one of clauses 9-20.

Clause 23. A method comprising: capturing content associated with a resource displayed on a user device; obtaining, from a generative model, semantic representations of portions of the content associated with the resource; storing the semantic representations in a history repository on the user device; and using the semantic representations to identify the resource as responsive to a query.

Clause 24. The method of clause 23, wherein a quantity of the semantic representations obtained for the resource is based on a tuning parameter.

Clause 25. The method of clause 23, wherein a quantity of the semantic representations obtained for the resource is based on an amount of memory available for the history repository on the user device.

Clause 26. The method of clause 23, wherein a quantity of the semantic representations obtained for the resource is determined by the generative model, the generative model being tuned on a quantity of passages to be stored per resource.

Clause 27. A system comprising: an electronic processor configured to perform the method of any one of clauses 23-26.

Clause 28. A non-transitory computer-readable medium including instructions that, when executed by an electronic processor, cause a computing system to perform the method of any one of clauses 23-26.

What is claimed is:

1. A method comprising:

receiving a portion of a query from a user interface;

identifying a resource from a history repository relevant to the portion of the query by:

processing the portion of the query through a generative model to generate a semantic representation of the portion of the query, and identifying a matching quantized embedding representing a corresponding passage from the resource by comparing the semantic representation of the portion of the query against a plurality of quantized embeddings stored in the history repository, wherein:

a measure of similarity between the matching quantized embedding representing the corresponding passage and the semantic representation of the portion of the query satisfies a threshold, the plurality of quantized embeddings were previously generated by quantizing a semantic representation of content to reduce its memory footprint for storage in the history repository, and a quantity of quantized embeddings generated for a resource is determined based on an amount of memory available for the history repository;

processing the portion of the query and the passage through the generative model to generate a response to the portion of the query based on the passage;

generating a resource suggestion corresponding to the resource; and providing, to the user interface, the response and the resource suggestion as a citation for the response.

2. The method of claim 1, wherein the matching quantized embedding is a quantized numerical representation, generated by the generative model, that approximates the passage.

3. A non-transitory computer-readable medium including instructions that, when executed by an electronic processor, cause a computing system to perform a method comprising:

receiving a portion of a query from a user interface;

identifying a resource from a history repository relevant to the portion of the query by:

processing the portion of the query through a generative model to generate a semantic representation of the portion of the query, and identifying a matching quantized embedding representing a corresponding passage from the resource by comparing the semantic representation of the portion of the query against a plurality of quantized embeddings stored in the history repository, wherein:

a measure of similarity between the matching quantized embedding representing the corresponding passage and the semantic representation of the portion of the query satisfies a threshold, the plurality of quantized embeddings were previously generated by quantizing a semantic representation of content to reduce its memory footprint for storage in the history repository, and a quantity of quantized embeddings generated for a resource is determined based on an amount of memory available for the history repository;

processing the portion of the query and the passage through the generative model to generate a response to the portion of the query based on the passage;

generating a resource suggestion corresponding to the resource; and providing, to the user interface, the response and the resource suggestion as a citation for the response.

4. The non-transitory computer-readable medium of claim 3, wherein the passage from the resource is included in a webpage, and the generative model is configured to generate embeddings for webpage content by training using training sets of webpage content.

5. The non-transitory computer-readable medium of claim 3, wherein processing the portion of the query and the passage through the generative model to generate a response to the portion of the query includes:

retrieving the passage from the resource, indexed content, or a cache; and providing the portion of the query and the retrieved passage to the generative model.

6. A system comprising:

a display providing a user interface;

a repository; and an electronic processor communicably coupled to the display and the repository, the electronic processor configured to:

receive a portion of a query from the user interface;

identify a resource from the repository relevant to the portion of the query by:

processing the portion of the query through a generative model to generate a semantic representation of the portion of the query, and identifying a matching quantized embedding representing a corresponding passage from the resource by comparing the semantic representation of the portion of the query against a plurality of quantized embeddings stored in the repository, wherein:

a measure of similarity between the matching quantized embedding representing the corresponding passage and the semantic representation of the portion of the query satisfies a threshold, the plurality of quantized embeddings were previously generated by quantizing a semantic representation of content to reduce its memory footprint for storage in the repository, and a quantity of quantized embeddings generated for a resource is determined based on an amount of memory available for the repository;

process the portion of the query and the passage through the generative model to generate a response to the portion of the query based on the passage;

generate a resource suggestion corresponding to the resource; and provide, to the user interface, the response and the resource suggestion as a citation for the response.

7. The method of claim 1, wherein the generative model is trained using a training set of webpage content to generate the semantic representation of the portion of the query and the plurality of quantized embeddings.

8. The method of claim 7, wherein the generative model is further trained based on a quantity of passages to be stored per resource.

9. The method of claim 1, wherein the resource suggestion is provided as a selectable query completion within a navigation text box of a browser.

10. The method of claim 1, wherein the plurality of quantized embeddings stored in the history repository includes multiple quantized embeddings that correspond to multiple respective passages from a single resource.

11. The method of claim 10, further comprising generating the multiple quantized embeddings by:

breaking content of the single resource into the multiple respective passages; and generating respective quantized embeddings for the multiple respective passages.

12. The method of claim 1, further comprising ranking a plurality of resources from the history repository based on a measure of similarity between their corresponding quantized embeddings and the semantic representation of the portion of the query, wherein the ranking limits a quantity of resources identified from a single domain.

13. The method of claim 1, wherein the history repository is within a memory-constrained computing environment, and wherein the identifying of the resource is performed without communication with a server.

14. The non-transitory computer-readable medium of claim 3, wherein the generative model is trained using a training set of webpage content to generate the semantic representation of the portion of the query and the plurality of quantized embeddings.

15. The non-transitory computer-readable medium of claim 3, wherein the plurality of quantized embeddings stored in the history repository includes multiple quantized embeddings that correspond to multiple respective passages from a single resource.

16. The system of claim 6, wherein the generative model is trained using a training set of webpage content to generate the semantic representation of the portion of the query and the plurality of quantized embeddings.

17. The system of claim 16, wherein the generative model is further trained based on a quantity of passages to be stored per resource.

18. The system of claim 6, wherein the plurality of quantized embeddings stored in the repository includes multiple quantized embeddings that correspond to multiple respective passages from a single resource.

19. The system of claim 18, wherein the electronic processor is further configured to generate the multiple quantized embeddings by:

breaking content of the single resource into the multiple respective passages, and generating respective quantized embeddings for the multiple respective passages.

20. The system of claim 6, wherein the electronic processor is further configured to rank a plurality of resources from the repository based on a measure of similarity between their corresponding quantized embeddings and the semantic representation of the portion of the query, and to limit, as part of the ranking, a quantity of resources identified from a single domain.

* * * * *